United States Patent
Lee et al.

(10) Patent No.: US 9,083,032 B2
(45) Date of Patent: Jul. 14, 2015

(54) LITHIUM RECHARGEABLE BATTERY HAVING A MIXED ANODE ACTIVE MATERIAL INCLUDING NANOTUBES

(75) Inventors: Young-Gi Lee, Daejeon (KR); Kwang Man Kim, Daejeon (KR); Min Gyu Choi, Daejeon (KR); Kunyoung Kang, Changwon-si (KR); Yil Suk Yang, Daejeon (KR); Jongdae Kim, Daejeon (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 345 days.

(21) Appl. No.: 13/287,100

(22) Filed: Nov. 1, 2011

(65) Prior Publication Data

US 2012/0107695 A1    May 3, 2012

(30) Foreign Application Priority Data

Nov. 2, 2010 (KR) .......... 10-2010-0108162

(51) Int. Cl.
- *H01M 4/13* (2010.01)
- *H01M 10/052* (2010.01)
- *H01M 4/36* (2006.01)
- *H01M 4/485* (2010.01)
- *H01M 4/58* (2010.01)
- *H01M 10/056* (2010.01)
- *H01M 4/62* (2006.01)

(52) U.S. Cl.
CPC ............ *H01M 4/13* (2013.01); *H01M 4/364* (2013.01); *H01M 4/485* (2013.01); *H01M 4/5825* (2013.01); *H01M 10/052* (2013.01); *H01M 10/056* (2013.01); *H01M 4/366* (2013.01); *H01M 4/625* (2013.01); *Y02E 60/122* (2013.01)

(58) Field of Classification Search
USPC ............ 429/304, 306, 309, 209, 233, 232, 429/231.1, 314, 231.9, 231.95, 316, 317
See application file for complete search history.

(56) References Cited

U.S. PATENT DOCUMENTS

| | | | |
|---|---|---|---|
| 5,169,736 A | 12/1992 | Bittihn et al. | |
| 5,292,601 A | 3/1994 | Sugeno et al. | |
| 5,705,291 A | 1/1998 | Amatucci et al. | |
| 6,287,726 B1 | 9/2001 | Ohta et al. | |
| 6,423,294 B2 | 7/2002 | Manev et al. | |
| 7,732,097 B2 | 6/2010 | Suzuki | |
| 8,012,625 B2 | 9/2011 | Yamamoto et al. | |
| 2006/0234125 A1* | 10/2006 | Valle | 429/231.95 |
| 2007/0042264 A1* | 2/2007 | Desilvestro et al. | 429/152 |
| 2009/0136850 A1 | 5/2009 | Yoon et al. | |
| 2009/0301866 A1* | 12/2009 | Zaghib et al. | 204/242 |
| 2010/0171466 A1* | 7/2010 | Spitler et al. | 320/134 |
| 2011/0136019 A1* | 6/2011 | Amiruddin et al. | 429/332 |

FOREIGN PATENT DOCUMENTS

| | | | |
|---|---|---|---|
| CN | 101202361 A | 6/2008 | |
| CN | 101378897 A | 3/2009 | |
| JP | 2009-252498 A | 10/2009 | |
| JP | 2010-040357 A | 2/2010 | |
| KR | 2007-0013840 A | 1/2007 | |
| KR | 2008-0044751 A | 5/2008 | |
| KR | 2009-0074429 A | 7/2009 | |
| WO | WO 2010/109722 | * 9/2010 | H01M 4/36 |

OTHER PUBLICATIONS

J.S. Gnanaraj et al., "Improving the high temperature performance of LiMn2O4 spinel electrodes by coating the active mass with MgO via a sonochemical method", Electrochemistry Communications, vol. 5, pp. 940-945, Nov. 2003.
G.G. Amatucci et al., "Surface treatments of $Li_{1+X}Mn_{2-x}O_4$ spinels for improved elevated temperature performance", Solid State Ionics, vol. 104, pp. 13-25, Dec. 1997.
Yu Pin Wu et al.; "Lithium Ion Battery—Application and Practice"; Chemical Industry Press; pp. 120 ad 268-295; Apr. 30, 2004.

* cited by examiner

*Primary Examiner* — Raymond Alejandro
(74) *Attorney, Agent, or Firm* — Rabin & Berdo, P.C.

(57) ABSTRACT

A lithium rechargeable battery includes a cathode plate having a cathode current collector layer; and a cathode layer composed of particles of a cathode active material; an anode plate that is spaced apart from the cathode plate and having an anode current collector layer and an anode layer composed a mixed anode active material that is a mixture including particles of a spinel lithium titanium oxide ($Li_4Ti_5O_{12}$) and nanotubes of a lithium titanium oxide ($Li_xTiO_2$, where $0<x<2$); and a polymer electrolyte disposed between the cathode plate and the anode plate. The cathode active material may contain only one cathode active material or be a mixed cathode active material composed of a mixture of particles of carbon-coated lithium iron phosphate ($LiFePO_4$) that are nanoparticles of lithium iron phosphate coated with carbon particles and particles of a lithium transition metal oxide.

7 Claims, 6 Drawing Sheets

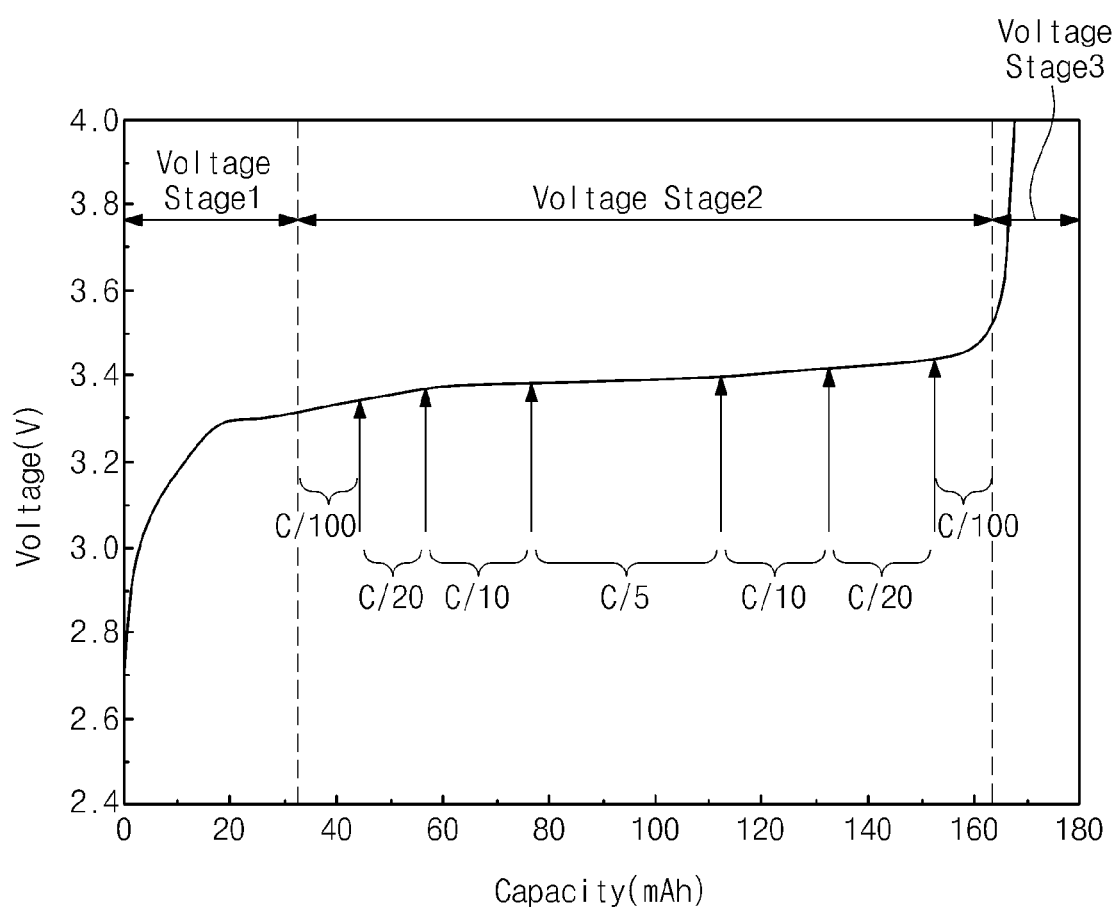

LITHIUM RECHARGEABLE BATTERY HAVING A MIXED ANODE ACTIVE MATERIAL INCLUDING NANOTUBES

CROSS-REFERENCE TO RELATED APPLICATIONS

This U.S. non-provisional patent application claims priority under 35 U.S.C. §119 of Korean Patent Application No. 10-2010-0108162, filed on Nov. 2, 2010, the entire contents of which are hereby incorporated by reference.

BACKGROUND OF THE DISCLOSURE

The present disclosure herein relates to a lithium rechargeable battery, and more particularly, to a lithium rechargeable battery for self-charging with an energy harvesting device.

Energy harvesting devices in general employ a principle of converting energy present in the environment, such as light, heat, vibration/pressure, radio wave, etc., into electric energy. Typical Energy harvesting devices include photovoltaic cells which directly convert light into electricity by the photoelectric effect, piezoelectric devices which convert vibration or pressure into electricity by the piezoelectric effect, and thermoelectric devices which directly transform heat into electricity by the thermoelectric effect. However, it is substantially impossible to generate a stable output over a long period of time due to spatial and environmental restrictions of the energy sources including light, heat, vibration/pressure, radio wave, etc. Since the voltage generated from a single energy harvesting device is usually one volt or lower, a series connection or modularization must be required when these devices are applied to other devices. Moreover, when the supply of the surrounding energy is interrupted for an extended period, devices into which the energy harvesting devices are applied may stop being driven.

Recently, studies on connecting a rechargeable battery which is an energy reservoir into an energy harvesting device have been actively conducted to overcome these drawbacks. That is, the development of self-charge power modules has been attempted, which ensures that the whole electric energy generated by an energy harvesting device is charged into a rechargeable battery in real time and the energy stored in the rechargeable battery is stably provided to another device. However, since energy generation by an energy harvesting device is basically irregular and the output is neither steady nor stable, the safe storage of the generated energy into a rechargeable battery has become an increasingly important issue.

Self-charging power modules may replace typical primary batteries applied to sensor nodes. Especially, the self-charging power modules are advantageously applied to the independent power supply devices installed in the environment incapable of wired charging and easy replacement of batteries. Accordingly, durability and safety are critical considerations for the rechargeable batteries applied to self-charging power modules. Rechargeable batteries applied to self-charging power modules should be able to be charged at a high speed such that they may be easily applied under the irregular charging environment, have a high charging efficiency, and be a reliable and long life span battery to secure cycle stability and cell safety.

SUMMARY OF THE DISCLOSURE

The present invention provides a lithium rechargeable battery appropriate for self-charging power modules, which may control the nominal voltage and operating voltage for uses, allow for the control of voltage patterns when the battery is charged and discharged, be easily charged under the charging environment using an energy harvesting device, and have excellent cell reliability.

Embodiments of the present invention provide lithium rechargeable batteries including: a cathode plate comprising a cathode current collector layer and a cathode layer; an anode plate spaced apart from the cathode plate, the anode plate comprising an anode current collector layer and an anode layer; and a polymer electrolyte disposed between the cathode plate and the anode plate, wherein at least one of the cathode layer and the anode layer comprises a mixed cathode active material or a mixed anode active material.

In some embodiments, the mixed cathode active material may include an olivine-type lithium iron phosphate ($LiFePO_4$) and a lithium transition metal oxide which are mixed at a weight ratio ranging from 1:99 to 99:1, wherein the olivine-type lithium iron phosphate is coated with a carbon particle and has a nanosize, wherein the lithium transition metal oxide contains a transition metal and is undoped or doped by impurities selected from a group consisting of aluminum, iron, copper, titanium and magnesium, and the transition metal is selected from a group consisting of nickel, cobalt and manganese.

In other embodiments, the mixed anode active material may include a spinel lithium titanium oxide ($Li_4Ti_5O_{12}$) and a lithium titanium oxide nanotube ($Li_xTiO_2$, $0<x<2$) which are mixed at a ratio ranging from 99:1 to 1:99.

In still other embodiments, the cathode layer may include a single cathode active material of the olivine-type lithium iron phosphate ($LiFePO_4$), an lithium transition metal oxide undoped with impurities, or an lithium transition metal oxide doped with impurities, wherein the olivine-type lithium iron phosphate is coated with a carbon particle and has a nanosize, wherein the lithium transition metal oxide contains a transition metal and is undoped or doped by impurities selected from a group consisting of aluminum, iron, copper, titanium and magnesium, and the transition metal is selected from a group consisting of nickel, cobalt and manganese.

In even other embodiments, the anode layer may include a single anode active material of a carbon-based or a non-carbon-based material, the carbon-based material comprising hard carbon, soft carbon or graphite, and the non-carbon-based material comprising a spinel lithium titanium oxide ($Li_4Ti_5O_{12}$) or lithium titanium oxide nanotube ($Li_xTiO_2$, $0<x<2$).

In yet other embodiments, the polymer electrolyte may include an organic electrolytic solution comprising a polymeric matrix, an inorganic additive and a salt.

In further embodiments, the polymeric matrix may include at least one selected from the group comprising polyethylene, polypropylene, polyimide, polysulfone, polyurethane, polyvinyl chloride, polystyrene, polyethylene oxide, polypropylene oxide, polybutadiene, cellulose, carboxymethylcellulose, nylon, polyacrylonitrile, polyvinylidene fluoride, polytetrafluoroethylene, a copolymer of vinylidene fluoride and hexafluoropropylene, a copolymer of vinylidene fluoride and trifluoroethylene, a copolymer of vinylidene fluoride and tetrafluoroethylene, polymethylacrylate, polyethylacrylate, polymethylmethacrylate, polyethylmethacrylate, polybuthylacrylate, polybuthylmethacrylate, polyvinylacetate, polyvinylalcohol, starch, agar and nafion, or a copolymer of the two or more, or a mixture thereof.

In still further embodiments, the organic electrolytic solution may include at least one selected from the group comprising ethylenecarbonate, propylenecarbonate, dimethylcarbonate, diethylcarbonate, ethylmethylcarbonate, tetrahydrofuran, 2-methyltetrahydrofuran, dimethoxyethane, methylformate, ethylformate, and γ-butyrolactone.

In even further embodiments, the inorganic additive may include at least one selected from the group comprising silica ($SiO_2$), talc, alumina ($Al_2O_3$), titanium dioxide ($TiO_2$), clay, and zeolite.

In yet further embodiments, the salt may include at least one selected from the group comprising lithium perchlorate ($LiClO_4$), lithium triflate ($LiCF_3SO_3$), lithium hexafluorophosphate ($LiPF_6$), lithium tetrafluoroborate ($LiBF_4$), and lithium trifluoromethane sulfonyl imide ($LiN(CF_3SO_2)_2$).

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain principles of the present disclosure. In the drawings:

FIG. 2 is an example of a charging method under the charging environment of an energy harvesting device according to some experimental examples of the present invention, and a graph visually expressing a method of charging a lithium rechargeable battery at 1V, 2V and 3V levels.

DETAILED DESCRIPTION OF PREFERRED EMBODIMENTS

Figure 1:
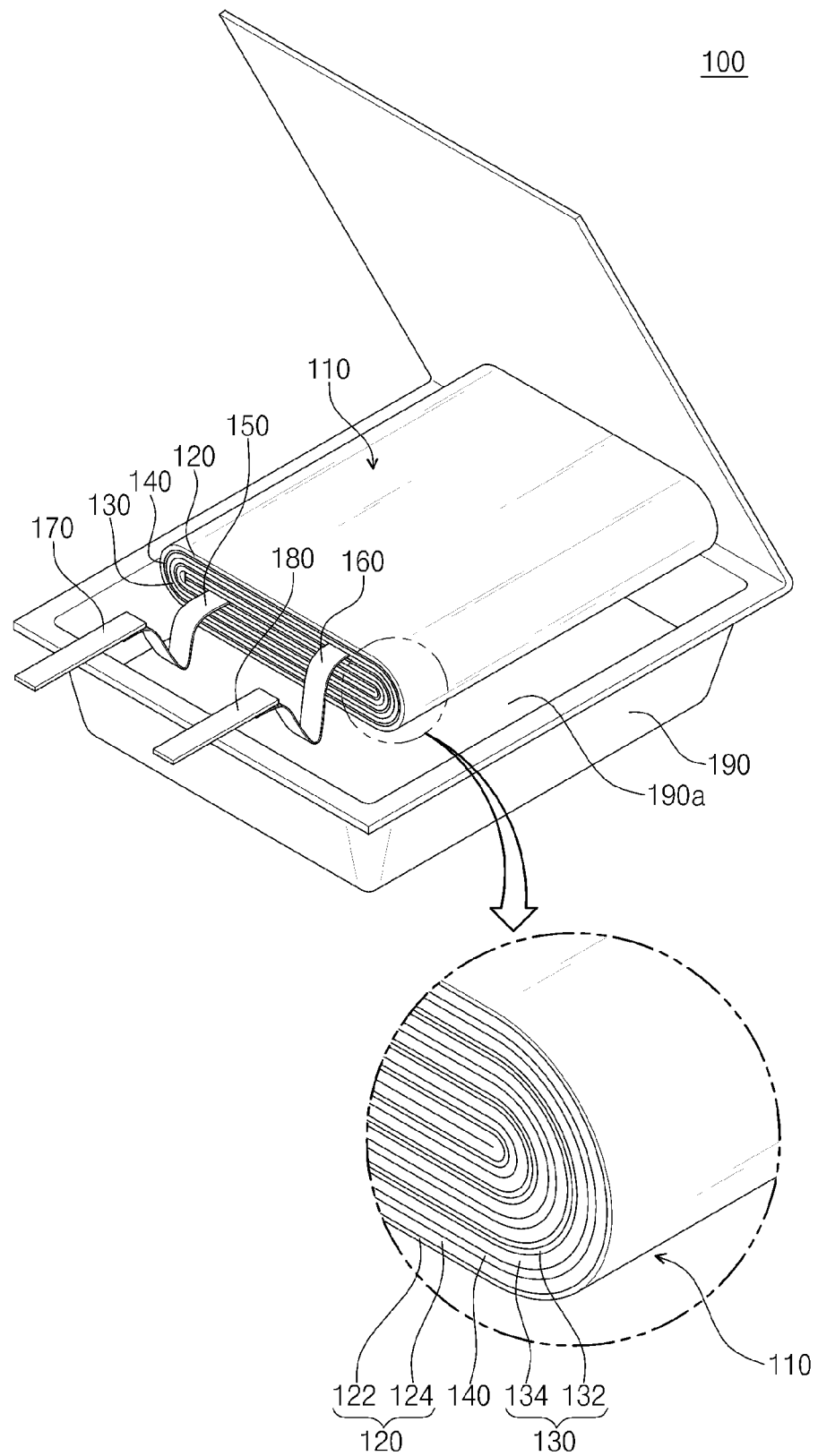
FIG. 1 is a partially exploded perspective view of a lithium rechargeable battery according to an embodiment of the present invention.

Hereinafter, the present disclosure will be described in detail with reference to the attached drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thickness of layer and regions are exaggerated for clarity. Like reference numerals in the drawings denote like elements.

FIG. 1 is a partially exploded perspective view of a lithium rechargeable battery according to an embodiment of the present invention. Referring to FIG. 1, a lithium rechargeable battery 100 according to an embodiment of the present invention includes an electrode assembly 110 which may be built into the internal space 190a of a pouch 190. The electrode assembly 110 may include a cathode plate 120 including a cathode current collector layer 122 and a cathode layer 124 including either one of a single cathode active material or a mixed cathode active material, an anode plate 130 separated from the cathode plate 120 and including an anode layer 134 including an anode current collector layer 132 and either one of a single anode active material or a mixed anode active material, and a polymer electrolyte 140 disposed between the cathode plate 120 and the anode plate 130. Herein, at least one of the cathode layer 124 and the anode layer 134 may include a mixed cathode active material or a mixed anode active material. That is, the electrode assembly 110 may be formed by stacking and then rolling the cathode plate 120, the polymer electrolyte 140, and the anode plate 130. Each of one sides of the cathode plate 120 and the anode plate 130 leads out into a cathode tab 150 and an anode tab 160 to lead out into the outside of the pouch 190, and then a cathode terminal 170 and an anode terminal 180 having certain lengths may be welded on the cathode tab 150 and the anode tab 160.

Specifically, the cathode plate 120 may be manufactured by coating the cathode layer 124 into the cathode current collector layer 122, wherein the cathode layer 124 includes either one of the single cathode active material or the mixed cathode active material.

The single cathode active material may include an olivine-type lithium iron-phosphate ($LiFePO_4$), a lithium transition metal oxide of Li-M-O (M=at least one of Ni, Co, and Mn) or a compound of the lithium transition metal oxide of Li-M-O (M=at least one of Ni, Co, and Mn) doped with at least one selected from the group consisting of aluminum (Al), iron (Fe), copper (Cu), titanium (Ti), and magnesium (Mg). (However, the composition ratio of Li-M-O (M=at least one of Ni, Co, and Mn) may vary depending on the type of a transition metal to be combined.)

For example, the lithium transition metal oxide of Li-M-O (M=at least one of Ni, Co, and Mn) may include lithium cobalt oxide ($LiCoO_2$), lithium nickel oxide ($LiNiO_2$), lithium manganese oxide ($LiMn_2O_4$), lithium nickel cobalt oxide ($LiNiCoO_2$, LiNiCoO), lithium cobalt manganese oxide ($LiCoMnO_4$, LiCoMnO), lithium nickel cobalt manganese oxide ($LiNiCoMnO_2$, LiNiCoMnO), etc.

The mixed cathode active material may include a mixture in which an olivine-type lithium iron-phosphate ($LiFePO_4$) of nanoparticles coated with the carbon particles and a lithium transition metal oxide of Li-M-O (M=at least one of Ni, Co, and Mn) or a compound of the lithium transition metal oxide of Li-M-O (M=at least one of Ni, Co, and Mn) doped with at least one selected from the group consisting of aluminum (Al), iron (Fe), copper (Cu), titanium (Ti), and magnesium (Mg) are mixed at a ratio of 1:99 to 99:1 (w/w).

The cathode current collector layer 122 may include an aluminum foil.

The anode plate 130 may be manufactured by coating the anode layer 134 into the anode current collector layer 132, wherein the anode layer 134 includes either one of the single anode active material or the mixed anode active material.

The single anode active material may include a carbon-based or non-carbon-based material. The carbon-based material may include hard carbon, soft carbon or graphite, etc. The non-carbon-based material may include spinel lithium titanium oxide ($Li_4Ti_5O_{12}$) or spinel lithium titanium oxide nanotube ($Li_xTiO2$, $0<x<2$).

The mixed anode active material may include a mixture in which the spinel lithium titanium oxide ($Li_4Ti_5O_{12}$) and the spinel lithium titanium oxide nanotube ($Li_xTiO2$, $0<x<2$) are mixed at a ratio of 99:1 to 1:99 (w/w).

The anode current collector layer 132 may include a copper foil.

The polymer electrolyte 140 may include a polymeric matrix and an organic electrolytic solution containing an inorganic additive and a salt.

The polymeric matrix may include one selected from the group consisting of polyethylene, polypropylene, polyimide, polysulfone, polyurethane, polyvinyl chloride, polystyrene, polyethylene oxide, polypropylene oxide, polybutadiene, cellulose, carboxymethylcellulose, nylon, polyacrylonitrile, polyvinylidene fluoride, polytetrafluoroethylene, a copolymer of vinylidene fluoride and hexafluoropropylene, a copolymer of vinylidene fluoride and trifluoroethylene, a copolymer of vinylidene fluoride and tetrafluoroethylene, polymethylacrylate, polyethylacrylate, polymethylmethacrylate, polyethylmethacrylate, polybuthylacrylate, polybuthylmethacrylate, polyvinylacetate, polyvinylalcohol, starch, agar and nafion, or a copolymer of the two or more, or a mixture thereof.

The organic electrolytic solution may include at least one selected from the group consisting of ethylenecarbonate, propylenecarbonate, dimethylcarbonate, diethylcarbonate, ethylmethylcarbonate, tetrahydrofuran, 2-methyltetrahydrofuran, dimethoxyethane, methylformate, ethylformate, and γ-butyrolactone.

The inorganic additive may include at least one selected from the group consisting of silica ($SiO_2$), talc, alumina ($Al_2O_3$), titanium dioxide ($TiO_2$), clay and zeolite.

The salt may include at least one selected from the group consisting of lithium perchlorate ($LiClO_4$), lithium triflate ($LiCF_3SO_3$), lithium hexafluorophosphate ($LiPF_6$), lithium tetrafluoroborate ($LiBF_4$), and lithium trifluoromethane sulfonyl imide ($LiN(CF_3SO_2)_2$).

The lithium rechargeable battery 100 may show impregnation characteristics from the injection of the polymer electrolyte 140 and long-lasting characteristics without leakage of the electrolytic solution.

Preferably, the lithium rechargeable battery 100 may control nominal voltage and operating voltage into 1 V- to 3 V-level freely according to the driving environment into which devices are applied through the three combinations listed below.

First, in the lithium rechargeable battery 100, a lithium rechargeable battery cell of 3 V-level nominal voltage may implemented by applying the anode plate 130 into the cathode plate 120, wherein the anode plate 130 includes the anode layer 134 including the single anode active material and the cathode plate 120 includes the cathode active material 124 including the mixed cathode active material. At the time, the changing patterns of the constant voltage stage when the battery is charged and discharged and of the voltage at both the terminals of cut-off voltage may be arbitrarily controlled by applying a mixed cathode system using the olivine-type lithium iron-phosphate ($LiFePO_4$).

Second, in the lithium rechargeable battery 100, a lithium rechargeable battery cell of 2 V-level nominal voltage may implemented by applying the anode plate 130 into the cathode plate 120, wherein the anode plate 130 includes the anode layer 134 including the mixed anode active material and the cathode plate 120 includes the cathode active material 124 including the single cathode active material. At the time, when the cell design is performed, energy density may be additionally improved by applying a mixed anode system using the lithium titanium oxide nanotube ($Li_xTiO_2$, $0<x<2$) to overcome the capacity limitation of a typical non-carbon-based anode.

Third, in the lithium rechargeable battery 100, a lithium rechargeable battery cell of 1 V-level nominal voltage may be implemented by applying the anode plate 130 into the cathode plate 120, wherein the anode plate 130 includes the anode layer 134 including the mixed anode active material and the cathode plate 120 includes the cathode active material 124 including the mixed cathode active material. At the time, the changing patterns of the constant voltage stage when the battery is charged and discharged and of the voltage at both the terminals of cut-off voltage may be arbitrarily controlled by applying a mixed cathode system using the olivine-type lithium iron-phosphate ($LiFePO_4$). In addition, when the cell design is performed, energy density may be additionally improved by applying a mixed anode system using the lithium titanium oxide nanotube ($Li_xTiO_2$, $0<x<2$) to overcome the capacity limitation of a typical non-carbon-based anode.

As described above, the lithium rechargeable battery 100 is appropriate for a self-charging power module operated by an energy harvesting device at relatively low-voltage levels of 1 V to 3 V.

A lithium rechargeable battery 100 according to an embodiment of the present invention may be formed by the following manufacturing methods.

The cathode is formed on the cathode current collector layer 122, wherein the cathode plate 120 includes the cathode layer 124 including either one of the single cathode active material or the mixed cathode active material. The anode plate 130 is formed on the anode current collector layer 132, wherein the anode plate 130 includes the anode layer 134 including either one of the single anode active material or the mixed anode active material. At this time, at least one of the cathode layer 124 or the anode layer 134 is formed to include the mixed cathode active material or the mixed anode active material. The cathode and anode are balanced by using the cathode plate 120 and the anode plate 130.

A polymer electrolyte 140 is sequentially stacked or rolled between the balanced cathode plate 120 and anode plate 130, and then a stacked or rolled cell is put into the pouch and an electrolytic solution is injected to be activated.

Hereinafter, the charging behavior of the lithium rechargeable battery charged by an energy harvesting device of the present invention will be described in detail with reference to Experimental Examples of the present invention.

Experimental Example 1

Manufacture of a 3V-Level Lithium Rechargeable Battery (Mixed Cathode/Single Anode)

A mixed cathode layer was formed on an aluminum cathode current collector layer. The mixed cathode layer was formed to have a composition of 85% by weight of particles in which an olivine-type lithium iron phosphate ($LiFePO_4$) coated with carbon particles is mixed with lithium cobalt oxide ($LiCoO_2$) at a ratio of 9:1, 5% by weight of a carbon black conductive material, and 10% by weight of a polyvinylidene fluoride binder and a surface area of 320 mm×21 mm. In addition, a single anode layer including a carbon-based single anode active material was formed on a copper anode current collector layer. The single anode layer was formed to have a composition of 95% by weight of natural graphite and 5% by weight of a polyvinylidene fluoride binder and a surface area of 80 mm×23 mm. A 3 V-level lithium rechargeable battery 352530 cell (thickness 3.5 mm, width 25 mm, height 30 mm) was manufactured by forming a polymer electrolytic film between the mixed cathode layer and the single anode layer to have a surface area of 390 mm×25 mm, stacking and rolling the film to be packaged into a pouch, and finally injecting a 1 M LiPF6 electrolytic solution (EC/DMC=1/1, by volume) into the pouch.

Comparative Example 1

The experiment was performed in the same manner as in the Experimental Example 1, except that a cathode layer was formed by applying the olivine-type lithium iron phosphate (LiFePO$_4$) coated with carbon particles on the aluminum cathode current collector layer alone.

The 3V-level lithium rechargeable battery was implemented to confirm the recharging behavior under the energy harvesting conditions.

Figure 3A:
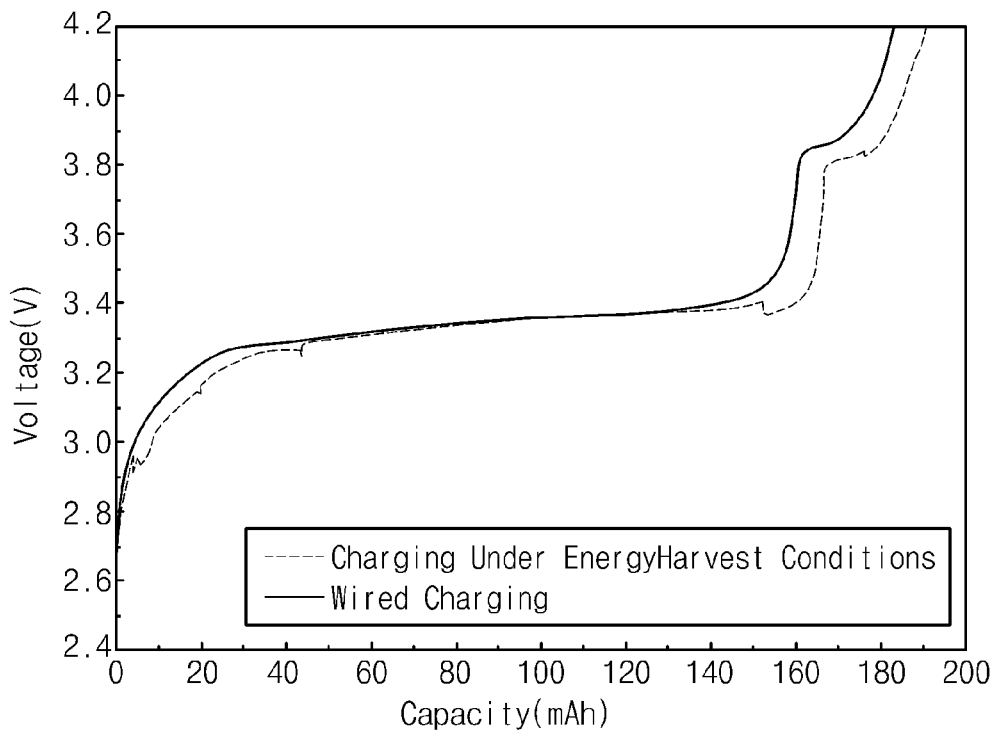
FIGS. 3A and 3B are graphs respectively showing the charging results of a 3V-level lithium rechargeable battery charged under the charging environment of an energy harvesting device according to Experimental Example 1 and Comparative Example 1 of the present invention.
Figure 3B:
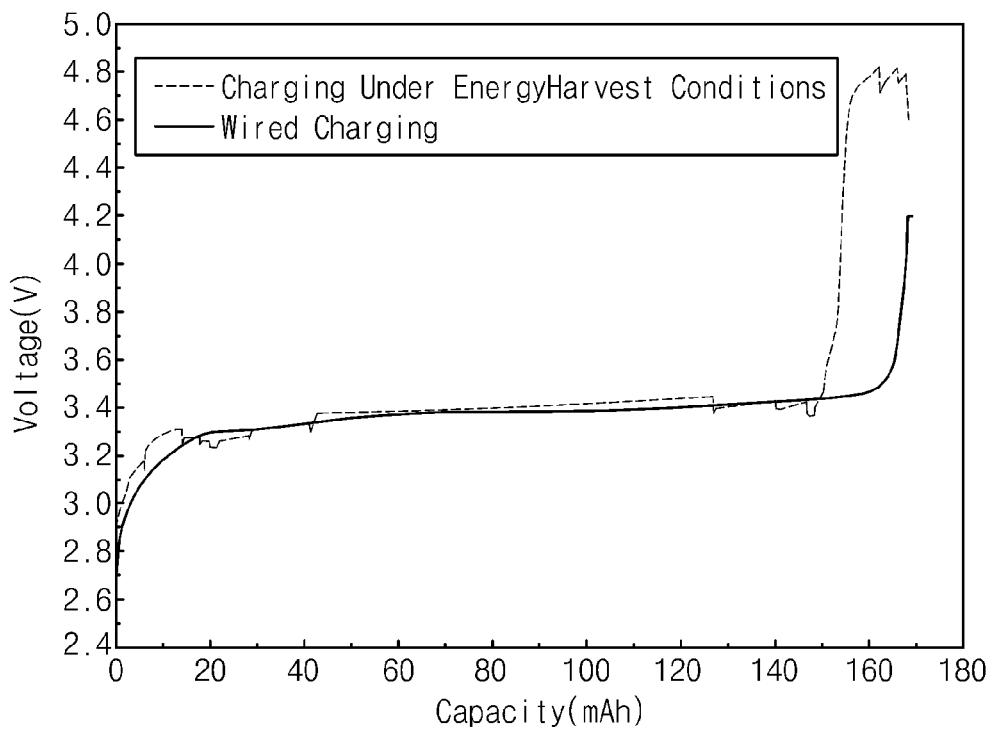

FIG. 2 is an example of a charging method under the charging environment of an energy harvesting device according to some experimental examples of the present invention, and a graph visually expressing a method of charging a lithium rechargeable battery at 1V, 2V and 3V levels, and FIGS. 3A and 3B are graphs respectively showing the charging results of a 3V-level lithium rechargeable battery charged under the charging environment of an energy harvesting device according to Experimental Example 1 and Comparative Example 1 of the present invention.

Referring to FIG. 2, the graph was divided into a total of 3 sections by considering both the end portions in which the voltage was drastically changed according to a schematic form of the graph obtained from the result of wired charging and discharging in the cut-off voltage stage of 2.5 V to 4.0 V and a relatively constant portion in which the voltage was not almost changed. Seven different charging currents were applied to each section, and a two minute pause was set between the steps.

The wired charging and discharging were continuously conducted on a completed lithium rechargeable battery by using a charger-discharger at 20 mA of currents (C/10) under the condition of constant current (CC)-constant voltage (CV) for 10 hours without a pause, and applied in the same manner as in those described as wired charging in FIGS. 3A and 3B, respectively.

Subsequently, the completed lithium rechargeable battery was charged through the charger-discharger under the conditions which are similar to those of CC-CV of the energy harvesting device and then, discharging was performed with the charger-discharger to estimate the charging behavior and charging capacity using the discharging capacity. The charging conditions to set up charging conditions similar to those of the energy harvesting device are shown in Table 1 below. These results are shown as charging of energy harvesting conditions in FIG. 3A and FIG. 3B, respectively.

TABLE 1

Charging conditions similar to the energy harvesting environment

|  | Step 1 | Step 2 | Step 3 | Step 4 | Step 5 | Step 6 | Step 7 |
|---|---|---|---|---|---|---|---|
| Voltage stage 1 (2.5-3.3 V) | C/100 M1 | C/20 M1 | C/10 M1 | C/5 M1 | C/10 M1 | C/20 M1 | C/100 M1 |
| Voltage stage 2 (3.3-3.5 V) | C/100 M2 | C/20 M2 | C/10 M2 | C/5 M2 | C/10 M2 | C/20 M2 | C/100 M2 |
| Voltage stage 3 (3.5-4.0 V) | C/100 M3 | C/20 M3 | C/10 M3 | C/5 M3 | C/10 M3 | C/20 M3 | C/100 M3 |

(C stands for charging capacity. Each of 100, 20, 10, and 5 means a duration of charging/discharging time (hour), respectively. For convenience, [mAh] is adopted as a unit of C. M1, M2, and M3 are durations of time, which are different in equal interval, and expressed as [mAh]. Each of the M1, M2, and M3 values depends on the C value.)

Referring to FIGS. 3A and 3B, when a mixed cathode was applied as in Experimental Example 1, it was confirmed that both overshooting and undershooting did not occur and charging capacity had not been decreased as in Comparative Example 1.

Especially, it was confirmed in Experimental Example 1 that not only operating voltage could be changed into 3 V-level but also the changing pattern of voltage at both the terminals of cut-off voltage could be arbitrarily controlled by applying a mixed cathode including the olivine-type lithium iron-phosphate.

Experimental Example 2

Discharging Capacity Test on a Mixed Anode for a Lithium Rechargeable Battery

A mixed anode was formed to have a composition of 85% by weight of particles in which spinel lithium titanium oxide (Li$_4$Ti$_5$O$_{12}$) nanoparticles coated with carbon particles are mixed with lithium titanium oxide (Li$_x$TiO$_2$, 0≤x≤2) nanotube at a ratio of 5:5, 5% by weight of a carbon black conductive material, and 10% by weight of a polyvinylidene fluoride binder and a surface area of 2 cm×2 cm with a thickness of 80 μm. Further, lithium foils with a thickness of 120 μm and a surface area of 2.2 cm×2.2 cm were manufactured as a reference electrode and a counter electrode and attached on copper collector layers. A polymer electrolytic film was formed between the mixed anode and the counter electrode, the polymer electrolytic film having a surface area of 2.4 cm×2.4 cm, stacked, and packaged into a pouch, and finally a 1 M LiPF$_6$ electrolytic solution (EC/DMC=1/1, by volume) to manufacture a half cell for a lithium.

Comparative Example 2

The experiment was performed in the same manner as in the Experimental Example 2, except that a cathode layer was formed by applying the spinel lithium titanium oxide (Li$_4$Ti$_5$O$_{12}$) coated with carbon particles alone.

To investigate the discharging capacity of the mixed anode for lithium rechargeable battery through the Experimental Example 2 and the Comparative Example 2, a performance test was performed on a half cell. For the test, a completed half cell was charged and discharged using a charger-discharger at the current condition of 20 mA/g (0.2 C) for 5 hours.

Figure 4:
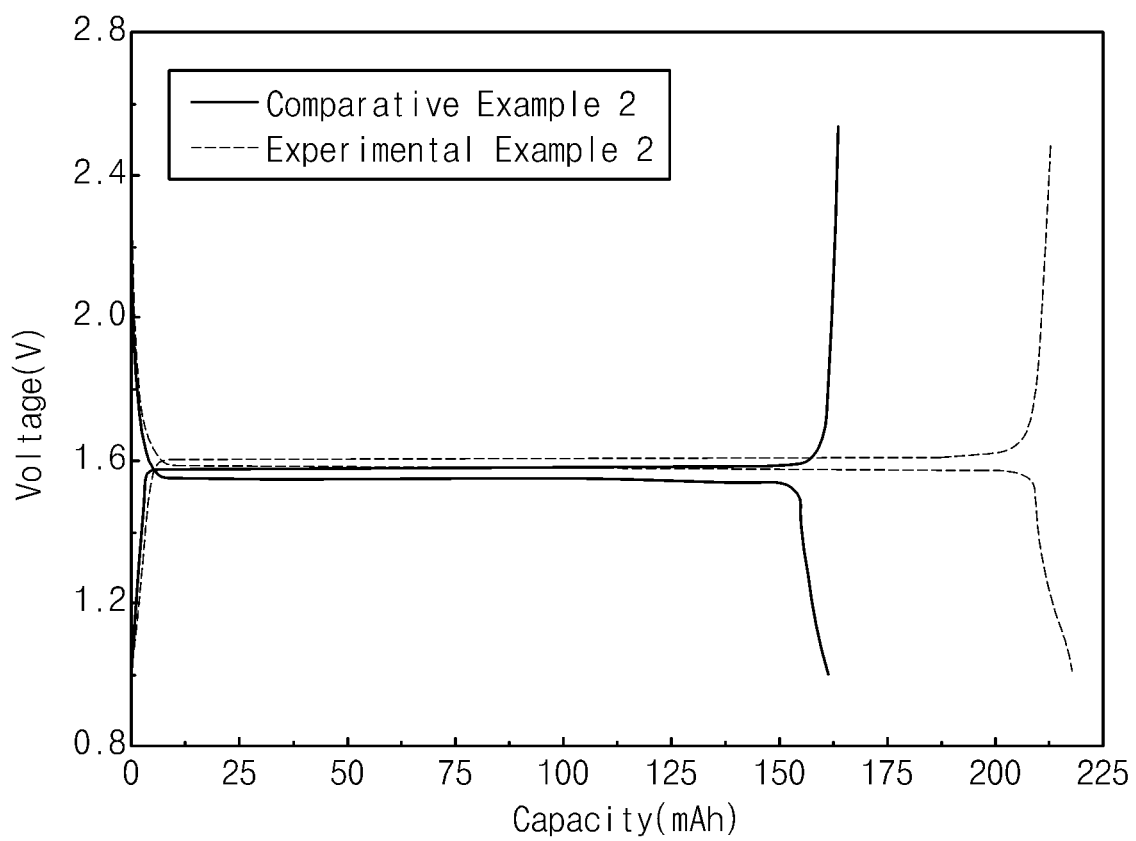
FIG. 4 is a graph showing the result of an improved discharging capacity of mixed anode for a lithium rechargeable battery according to Experimental Example 2 and Comparative Example 2 of the present invention.

FIG. 4 is a graph showing the result of an improved discharging capacity of mixed anode for a lithium rechargeable battery according to Experimental Example 2 and Comparative Example 2 of the present invention.

Referring to FIG. 4, it was confirmed that the capacity was improved by 30% or more while the potential constant region was maintained longer in Experimental Example 2 where a mixed anode was applied using a mixture of spinel lithium titanium oxide (Li$_4$Ti5O$_{12}$) nanoparticles coated with carbon particles and lithium titanium oxide (Li$_x$TiO$_2$. 0<x<2) nanotube, compared to Comparative Example 2 where the spinel lithium titanium oxide (Li$_4$Ti5O$_{12}$) coated with carbon particles was only used.

Experimental Example 3

Manufacture of a 2V-Level Lithium Rechargeable Battery (Single Cathode/Mixed Anode)

Two titanium-based mixed anode layers were formed on a copper anode current collector layer. The mixed anode layer was formed to have a composition of 85% by weight of mixed anode particles in which spinel lithium titanium oxide ($Li_4Ti_5O_{12}$) nanoparticles coated with carbon particles are mixed with lithium titanium oxide ($Li_xTiO_2$, 0<X<2) nanotube at a ratio of 5:5, 5% by weight of a carbon black conductive material, and 10% by weight of a polyvinylidene fluoride binder and a surface area of 2.2 cm×2.2 cm. In addition, a cathode layer including lithium cobalt oxide ($LiCoO_2$) was formed on an aluminum cathode current collector layer. The cathode layer was formed to have a composition of 93% by weight of lithium cobalt oxide ($LiCoO_2$) microparticles, 3% by weight of a carbon black conductive material, and 4% by weight of a polyvinylidene fluoride binder and a surface area of 2 cm×2 cm. A polymer electrolytic film was formed between the single cathode layer and the mixed anode layer, the polymer electrolytic film having a surface area of 2.4 cm×2.4 cm, stacked, and packaged into a pouch, and finally a 1 M $LiPF_6$ electrolytic solution (EC/DMC=1/1, by volume) was injected to manufacture a 2V-level lithium rechargeable battery.

Comparative Example 3

The experiment was performed in the same manner as in the Experimental Example 3, except that an anode layer was formed by applying the spinel lithium titanium oxide ($Li_4Ti_5O_{12}$) nanoparticles coated with carbon particles alone.

The 2V-level lithium rechargeable battery was implemented to confirm the recharging behavior under the energy harvesting conditions. A charging and discharging curve was investigated on the completed 2V-level lithium rechargeable battery by using a charger-discharger at 20 mA of currents (C/10) under the condition of constant current (CC)-constant voltage (CV) for 10 hours without a pause, and the results were shown as wired charging in FIGS. 5A and 5B, respectively.

Subsequently, charging was performed under the conditions which are similar to the environment of the energy harvesting device, discharging was again performed through the charger-discharger, and then the discharged capacity was used to confirm the charging behavior and charging capacity. These results are shown as charging of energy harvesting conditions in FIG. 5A and FIG. 5B, respectively. In order to set up charging environment similar to that of the energy harvesting device, the experiment was performed under the same conditions as those in Table 1, except that only the range of the cut-off voltage was changed into 1.5 to 2.5 in the charging conditions.

Figure 5A:
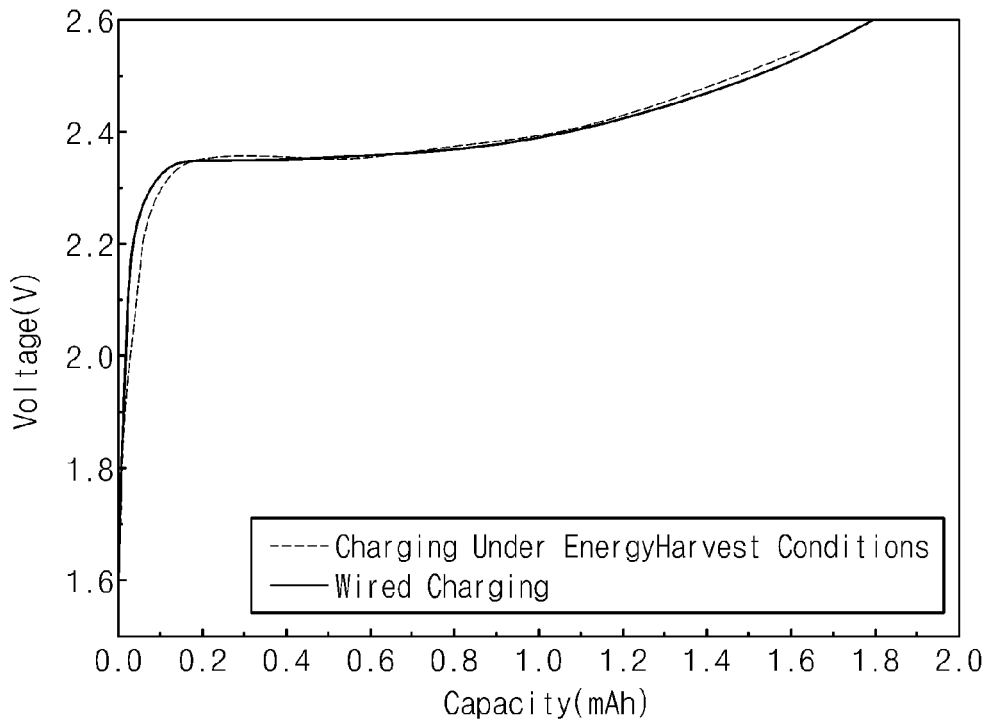
FIGS. 5A and 5B are graphs respectively showing the charging results of a 2V-level lithium rechargeable battery charged under the charging environment of an energy harvesting device according to Experimental Example 3 and Comparative Example 3 of the present invention.
Figure 5B:
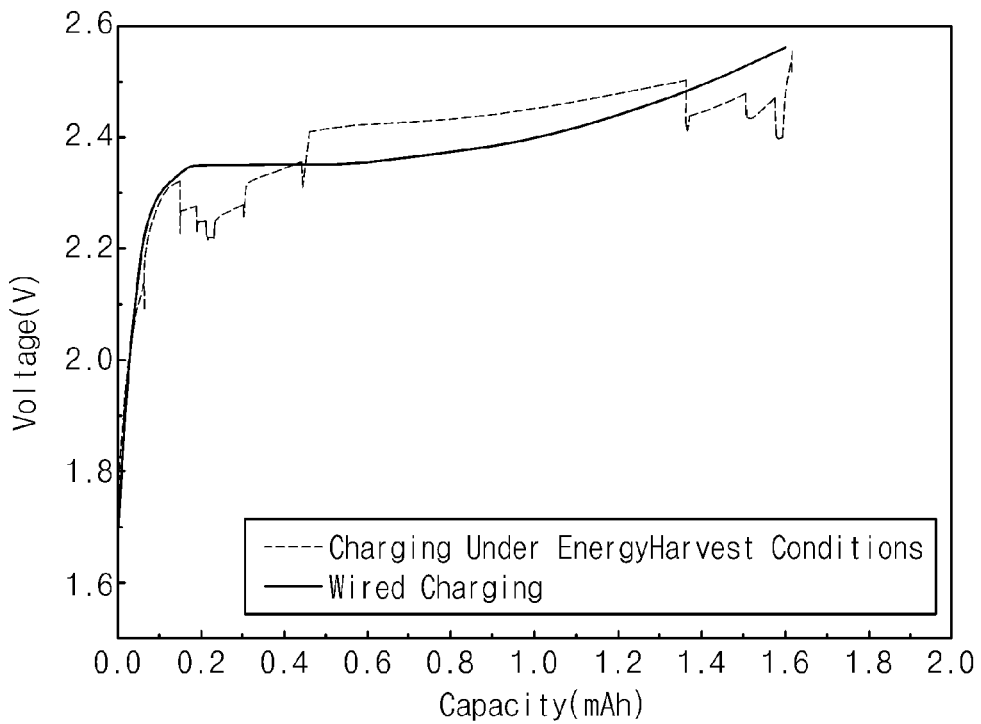

FIGS. 5A and 5B are graphs showing the charging results of a 2V-level lithium rechargeable battery charged under the charging environment of an energy harvesting device according to Experimental Example 3 and Comparative Example 3 of the present invention.

Referring to FIGS. 5A and 5B, when a mixed cathode was applied as in Experimental Example 1, it was confirmed that both overshooting and undershooting did not occur and charging capacity had not been decreased as in Comparative Example 1. In addition, when the lithium titanium oxide ($Li_xTiO_2$) was applied, it was confirmed that the charging capacity was increased by about 12% compared to the capacity when the spinel lithium titanium oxide ($Li_4Ti_5O_{12}$) coated with carbon nanoparticles was applied alone.

Experimental Example 4

Manufacture of a 1 V-Level Rechargeable Battery
(Mixed Cathode/Mixed Anode)

A mixed cathode layer was formed on an aluminum cathode current collector layer. At this time, the mixed cathode layer was formed to have a composition of about 85 wt. % of particles, about 5 wt. % of a carbon black conductive material, and about 10 wt. % of polyvinylidene fluoride binder and to have a surface area of about 2 cm×2 cm. The particles are formed by mixing both an olivine-type lithium iron phosphate ($LiFePO_4$) coated with carbon particles and lithium cobalt oxide ($LiCoO_2$) of microsize at a ratio of 9:1 by weight. Furthermore, a titanium-type mixed anode layer is formed on a copper anode current collector layer. At this time, the mixed anode layer was formed to have a composition of about 85 wt. % of mixed anode particles, about 5 wt. % of a carbon black conductive material, and about 10 wt. % of polyvinylidene fluoride binder and to have a surface area of about 2.2 cm×2.2 cm. The mixed anode particles are formed by mixing both a spinel lithium titanium oxide ($Li_4Ti_5O_{12}$) nanoparticles coated with carbon particles and lithium titanium oxide ($Li_xTiO_2$, 0<X<2) nanotube at a ratio of 5:5 by weight. A polymer electrolytic film was formed between the mixed cathode layer and the mixed anode layer, the polymer electrolytic film having a surface area of 2.4 cm×2.4 cm, stacked, and packaged into a pouch, and finally a 1 M $LiPF_6$ electrolytic solution (EC/DMC=1/1, by volume) was injected to manufacture a 1 V-level lithium rechargeable battery.

Comparative Example 4

The experiment was performed in the same manner as in the Experimental Example 4, except that a cathode layer was formed by applying an olivine-type lithium iron phosphate ($LiFePO_4$) coated with carbon particles alone and an anode layer was formed by applying the spinel lithium titanium oxide ($Li_4Ti_5O_{12}$) nanoparticles coated with carbon particles alone.

The 1V-level lithium rechargeable battery was implemented to confirm the recharging behavior under the energy harvesting conditions. A charging and discharging curve was investigated on the completed 1 V-level lithium rechargeable battery by using a charger-discharger at 20 mA of currents (C/10) under the condition of constant current (CC)-constant voltage (CV) for 10 hours without a pause, and the results were shown as wired charging in FIGS. 6A and 6B, respectively.

Subsequently, charging was performed under the conditions which are similar to the environment of the energy harvesting device, discharging was again performed through the charger-discharger, and then the discharged capacity was used to confirm the charging behavior and charging capacity. These results are shown as charging of energy harvesting conditions in FIG. 6A and FIG. 6B, respectively. In order to set up charging environment similar to that of the energy harvesting device, the experiment was performed under the same conditions as those in Table 1, except that only the range of the cut-off voltage was changed into 1.0 to 2.5 in the charging conditions.

Figure 6A:
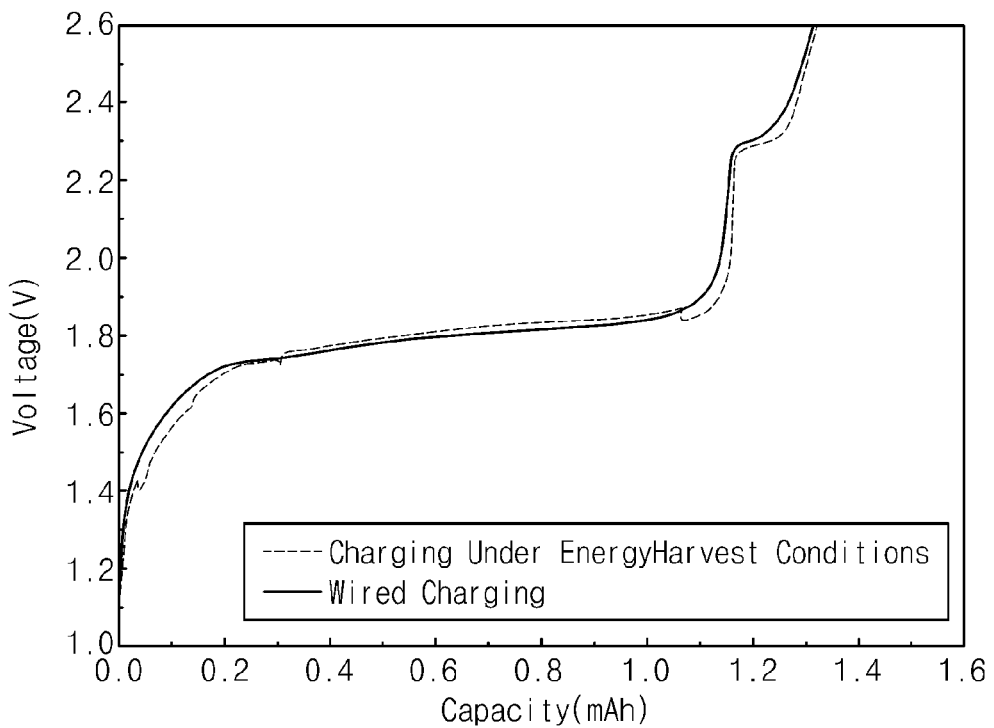
FIGS. 6A and 6B are graphs respectively showing the charging results of a 1V-level lithium rechargeable battery charged under the charging environment of an energy harvesting device according to Experimental Example 4 and Comparative Example 4 of the present invention.
Figure 6B:
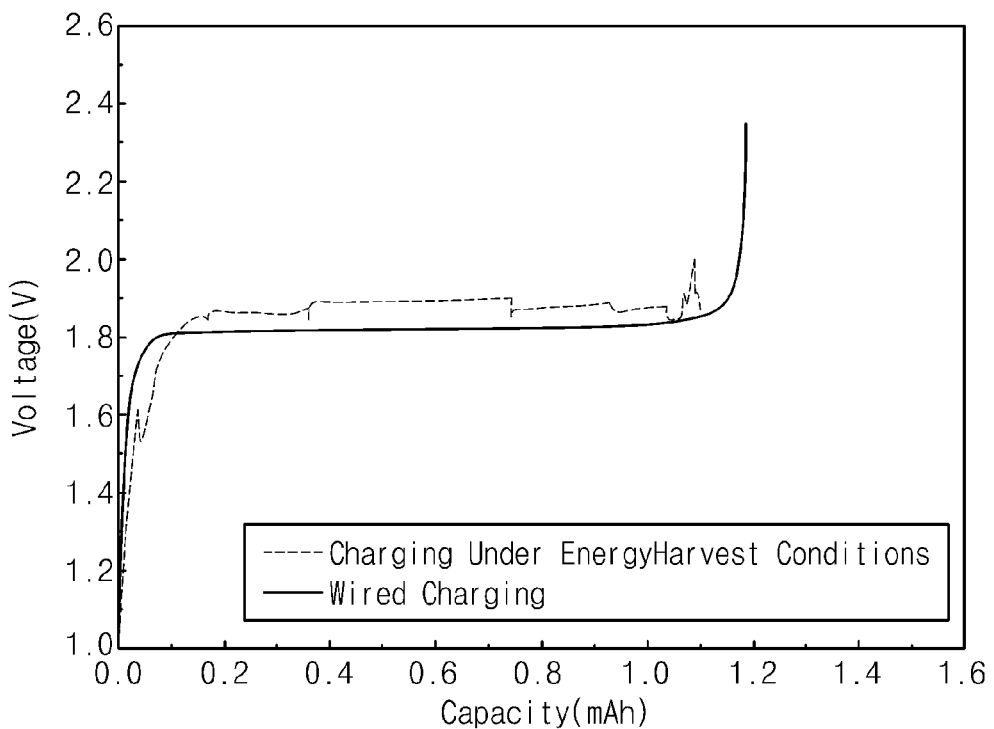

FIGS. 6A and 6B are graphs respectively showing the charging results of a 1V-level lithium rechargeable battery charged under the charging environment of an energy harvesting device according to Experimental Example 4 and Comparative Example 4 of the present invention.

Referring to FIGS. 6A and 6B, when the mixed cathode and the mixed anode were simultaneously applied as in Experimental Example 4, it was confirmed that both overshooting and undershooting did not occur and charging capacity had not been decreased as in Comparative Example 4. Especially, it was confirmed in Experimental Example 4 that when the battery is charged and discharged, the charging pattern of voltage at both the terminal of cut-off voltage could be arbitrarily controlled by applying a mixed cathode including the olivine-type lithium iron phosphate (LiFePO$_4$) and that when a mixed anode including the lithium titanium oxide nanotube (LixTiO$_2$, 0<x<2) was applied, the charging capacity was increased by about 17% compared to the capacity in Comparative Example 4.

As described above, according to the present invention, a lithium rechargeable battery appropriate for a self-charging power module at 1 V to 3 V level may be implemented by controlling the ranges of nominal voltage and operating voltage through a plurality of combinations of a mixed cathode and/or mixed anode system. The lithium rechargeable battery has excellent cell reliability because it does not show the overshooting or undershooting behavior and the degradation in cell performance does not occur due to the ability of the battery to be stably charged without the generation of overvoltage, which is almost similar to the ability in wired charging. In addition, in the lithium rechargeable battery, the changing patterns of the constant voltage stage when the battery is charged and discharged and of the voltage at both the terminals of cut-off voltage may be arbitrarily controlled by applying a mixed cathode including an olivine-type lithium iron-phosphate (LiFePO$_4$) or a mixed anode including a lithium titanium oxide (Li$_x$TiO$_2$, 0<x<2). The energy density may be additionally improved by applying a mixed anode including the lithium titanium oxide (LixTiO$_2$, 0<x<2) to overcome the capacity limitation of a typical non-carbon-based anode. Accordingly, when an integrated power module for self-charging is configured through a combination of a plurality of energy harvesting devices, it would be very advantageous to the implementation by applying a cell manufactured by the present invention.

In a lithium rechargeable battery according to an embodiment of the present invention, the ranges of nominal voltage and operating voltage and the changing patterns of the constant voltage stage when the battery is charged and discharged and of the voltage at both the terminals of cut-off voltage may be arbitrarily controlled through a combination of mixed cathode and/or mixed anode systems. The cell reliability is excellent because the charging is easily performed under the provision of an irregular and intermittent charging current provided by an energy harvesting device, the charging efficiency is excellent, and the degeneration in cell performance does not occur. When an integrated power module for self-charging is configured through a combination of a plurality of energy harvesting devices, it would be very advantageous to the implementation by applying a cell manufactured by the present invention.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A lithium rechargeable battery, comprising:
    a cathode plate comprised of a cathode current collector layer; and a cathode layer comprising particles of a mixed cathode active material comprised of:
        (a) particles of carbon-coated lithium iron phosphate (LiFePO$_4$) that are nanoparticles of lithium iron phosphate (LiFePO$_4$) coated with carbon particles; and
        (b) particles of a lithium transition metal oxide containing a transition metal selected from the group consisting of nickel, cobalt and manganese, that are undoped or doped by impurities selected from the group consisting of aluminum, iron, copper, titanium and magnesium;
    an anode plate spaced apart from the cathode plate and comprised of an anode current collector layer; and an anode layer comprising a mixed anode active material comprised of:
        particles of a spinel lithium titanium oxide (Li$_4$Ti$_5$O$_{12}$); and
        nanotubes of a lithium titanium oxide, Li$_x$TiO$_2$, where 0<x<2, that are present in an amount effective to increase charging capacity of the lithium rechargeable battery above that of a lithium rechargeable battery with an anode layer containing only particles of a spinel lithium titanium oxide (Li$_4$Ti$_5$O$_{12}$); and
    a polymer electrolyte disposed between the cathode plate and the anode plate,
    wherein the particles of a spinel lithium titanium oxide (Li$_4$Ti$_5$O$_{12}$) and the nanotubes of a lithium titanium oxide, Li$_x$TiO$_2$, where 0<x<2, of the mixed anode active material are present in the mixture in a weight ratio ranging from 99:1 to 1:99.

2. The lithium rechargeable battery of claim 1, wherein the polymer electrolyte comprises an organic electrolytic solution comprising a polymeric matrix, an inorganic additive and a salt.

3. The lithium rechargeable battery of claim 2, wherein the polymeric matrix comprises at least one material selected from the group consisting of polyethylene, polypropylene, polyimide, polysulfone, polyurethane, polyvinyl chloride, polystyrene, polyethylene oxide, polypropylene oxide, polybutadiene, cellulose, carboxymethylcellulose, nylon, polyacrylonitrile, polyvinylidene fluoride, polytetrafluoroethylene, a copolymer of vinylidene fluoride and hexafluoropropylene, a copolymer of vinylidene fluoride and trifluoroethylene, a copolymer of vinylidene fluoride and tetrafluoroethylene, polymethylacrylate, polyethylacrylate, polymethylmethacrylate, polyethylmethacrylate, polybutylacrylate, polybuthylmethacrylate, polyvinylacetate, polyvinylalcohol, starch, agar, and nafion, or a copolymer of at least two of said at least one material.

4. The lithium rechargeable battery of claim 2, wherein the organic electrolytic solution comprises at least one material selected from the group consisting of ethylenecarbonate, propylenecarbonate, dimethylcarbonate, diethylcarbonate, ethylmethylcarbonate, tetrahydrofuran, 2-methyltetrahydrofuran, dimethoxyethane, methylformate, ethylformate, and γ-butyrolactone.

5. The lithium rechargeable battery of claim 2, wherein the inorganic additive comprises at least one material selected from the group consisting of silica (SiO$_2$), talc, alumina (Al$_2$O$_3$), titanium dioxide (TiO$_2$), clay, and zeolite.

6. The lithium rechargeable battery of claim 2, wherein the salt comprises at least one material selected from the group consisting of lithium perchlorate (LiClO$_4$), lithium triflate (LiCF$_3$SO$_3$), lithium hexafluorophosphate (LiPF$_6$), lithium tetrafluoroborate (LiBF$_4$), and lithium trifluoromethane sulfonyl imide (LiN(CF$_3$SO$_2$)$_2$).

7. A lithium rechargeable battery, comprising:
    a cathode plate comprised of a cathode current collector layer; and a cathode layer comprising particles of only one cathode active material selected from
        (a) particles of a lithium iron phosphate (LiFePO$_4$) that are nanoparticles and that are coated with carbon particles, or (b) particles of a lithium transition metal oxide containing a transition metal oxide selected from the group consisting of nickel, cobalt and manganese, that are undoped or is doped with impurities selected from the group consisting of aluminum, iron, copper, titanium and magnesium;

an anode plate spaced apart from the cathode plate and comprised of an anode current collector layer; and an anode layer comprising a mixed anode active material that is a mixture comprised of:

particles of a spinel lithium titanium oxide ($Li_4Ti_6O_{12}$); and nanotubes of a lithium titanium oxide, $Li_xTiO_2$, where $0<x<2$, that are present in an amount effective to increase charging capacity of the lithium rechargeable battery above that of a lithium rechargeable battery with an anode layer containing only particles of a spinel lithium titanium oxide ($Li_4Ti_6O_{12}$); and a polymer electrolyte disposed between the cathode plate and the anode plate, wherein the particles of a spinel lithium titanium oxide ($Li_4Ti_5O_{12}$) and the nanotubes of a lithium titanium oxide, $Li_xTiO_2$, where $0<x<2$, of the mixed anode active material are present in the mixture in a weight ratio ranging from 99:1 to 1:99.

* * * * *